(12) United States Patent
Städele et al.

(10) Patent No.: US 12,280,725 B2
(45) Date of Patent: Apr. 22, 2025

(54) CONTACTING DEVICE

(71) Applicant: ZF Friedrichshafen AG, Friedrichshafen (DE)

(72) Inventors: Johannes Städele, Bermatingen (DE); Danilo Lind, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 967 days.

(21) Appl. No.: 17/420,065

(22) PCT Filed: Dec. 4, 2019

(86) PCT No.: PCT/EP2019/083627
§ 371 (c)(1),
(2) Date: Jun. 30, 2021

(87) PCT Pub. No.: WO2020/141035
PCT Pub. Date: Jul. 9, 2020

(65) Prior Publication Data
US 2022/0080905 A1    Mar. 17, 2022

(30) Foreign Application Priority Data
Jan. 3, 2019 (DE) ..................... 10 2019 200 021.5

(51) Int. Cl.
*B60R 16/023* (2006.01)
*H01R 25/16* (2006.01)

(52) U.S. Cl.
CPC ....... *B60R 16/0238* (2013.01); *H01R 25/162* (2013.01); *H01R 2201/26* (2013.01)

(58) Field of Classification Search
CPC .............. B60R 16/023; B60R 16/0238; B60R 16/0239; H01R 25/16; H01R 25/161; H01R 25/162; H01R 2201/26
(Continued)

(56) References Cited

U.S. PATENT DOCUMENTS 6,028,770 A    2/2000 Kerner et al.
2022/0080905 A1*  3/2022 Städele ............... B60R 16/0238

FOREIGN PATENT DOCUMENTS

DE         102009029166 A1    3/2011
DE      10 2019 200 021 A1    7/2020
(Continued)

OTHER PUBLICATIONS

International Search Report (with English translation) and Written Opinion from corresponding PCT Application No. PCT/EP2019/083627 mailed on Apr. 2, 2020 (13 pages).

*Primary Examiner* — Khiem M Nguyen
(74) *Attorney, Agent, or Firm* — Crowell & Moring LLP (57) ABSTRACT

A contacting device, comprising a U-shaped conductor structure made of an electrically conductive material, and containing a first fastener, a second fastener, and a power rail, and an enclosure encompassing the conductor structure, made of a non-conductive material, wherein the enclosure has a hole at the first fastener, configured to receive a first supply element between the first fastener and the enclosure and thus electrically connect the first supply element to the first fastener, wherein the enclosure has a second hole at the second fastener, configured to receive a second supply element between the second fastener and the enclosure and thus electrically connect the second supply element to the second fastener, wherein the enclosure has a third hole at the power rail, configured to receive a conductor element between the power rail and the enclosure and thus electrically connect the conductor element to the power rail.

19 Claims, 4 Drawing Sheets

(58) Field of Classification Search
USPC .......................................................... 439/76.2
See application file for complete search history.

(56) References Cited

FOREIGN PATENT DOCUMENTS

| | | |
|---|---|---|
| EP | 0735622 | 10/1996 |
| WO | WO 2017222077 A1 | 12/2017 |
| WO | WO 2020/141035 A1 | 7/2020 |

* cited by examiner

CONTACTING DEVICE

CROSS-REFERENCE TO RELATED APPLICATIONS

This application is a U.S. national stage application under 35 U.S.C. § 371 of PCT Application No. PCT/EP2019/083627, filed on Dec. 4, 2019, and published as WO 2020/141035 A1 on Jul. 9, 2020, which claims priority from German Application No. DE 10 2019 200 021.5, filed on Jan. 3, 2019, the entirety of which are each hereby fully incorporated by reference herein.

The invention relates to a contacting device, a power supply system, and a method for the production thereof.

Contacting devices are known in principle from the prior art. A supply element in a power supply is normally screwed to a fastener on the contacting device for this, and a conductor element in a control unit is screwed to another fastener on the contacting device.

DE102009029166A1 describes, by way of example, a modular power distributer, comprising a base module with a central power supply and at least two universal modules.

The object of the present invention is to create an improved contacting device, an improved power supply system, and an improved method for the production thereof.

This object is achieved by a contacting device comprising a U-shaped conductor structure composed of a conductive material, and a first fastener, a second fastener, and a power bus, as well as an enclosure encompassing the conductor structure made of a non-conductive material, wherein the enclosure has a first hole at the first fastener that is configured to receive a first supply element between the first fastener and the enclosure and thus electrically connect the first supply element to the first fastener, wherein the enclosure has a second hole at the second fastener that is configured to receive a second supply element between the second fastener and the enclosure and thus electrically connect the second supply element to the second fastener, wherein the enclosure has a third hole at the power rail that is configured to receive a conductor element between the power rail and the enclosure and thus electrically connect the conductor element to the power rail.

The contacting device first comprises a U-shaped conductor structure composed of an electrically conductive material and containing a first fastener, second fastener, and a power rail. The first fastener forms a first leg of the U-shaped conductor structure, the second fastener forms a second leg of the U-shaped conductor structure, and the power rail forms the connection between the legs of the U-shaped conductor structure. The fasteners and the power rail can contain curved and straight sections. The first and second fasteners each have at least one straight section. The straight section of the first fastener lies in a first plane, and the straight section of the second fastener lies in a second plane, parallel to the first plane. The transition between the fasteners and the power rail can be a right angle, forming a corner or a curve.

By way of example, the first and second fasteners and the power rail can be straight, while the transition from the first fastener to the power rail can be a right angle, and the transition from the second fastener to the power rail can also be a right angle. The cross section of the power rail can be rectangular, such that the power rail as a whole forms a rectangular box-shaped element.

The contacting device also comprises an enclosure that encompasses the conductor structure, made of a non-conductive material. The enclosure nearly entirely encloses the conductor structure, with the exception of the defined holes.

The enclosure also contains a first hole at the first fastener. The first hole reaches to the first fastener, such that the hollow space formed by the first hole is delimited at one side by the conductive first fastener. The first hole is configured to receive a first supply element between the first fastener and the enclosure and thereby electrically connect the first supply element to the first fastener. The first supply element can thus be inserted into the hollow space formed by the first hole and fixed in place there between a surface of the first fastener and a surface of the enclosure.

The enclosure also contains a second hole at the second fastener. The second hole reaches to the second fastener, analogously to the first hole, such that the hollow space formed by the second hole is delimited at one side by the conductive second fastener. The second hole is configure to receive a second supply element between the second fastener and the enclosure and thereby electrically connect second supply element to the second fastener. The second supply element can therefore be inserted into the hollow space formed by the second hole and fixed in place there between a surface of the second fastener and a surface of the enclosure.

The enclosure also contains a third hole at the power rail. The third hole reaches to the power rail, analogously to the first and second holes, such that the hollow space formed by the third hole is delimited at one side by the conductive power rail. The third hole is configured to receive a conductor element between the power rail and the enclosure and thereby electrically connect the conductor element to the third fastener. The conductor element can therefore be inserted into the hollow space formed by the third hole and fixed in place there between a surface of the power rail and a surface of the enclosure.

The first, second, and third holes each extend over a limited portion of the conductor structure. By way of example, the first hole and/or the second hole can extend over the entire width and a limited length of the respective fastener, wherein the respective hole extends longitudinally over the respective fastener to an edge of the enclosure. The third hole can extend over the entire width and a limited length of the power rail, wherein the hole extends laterally over the power rail to an edge of the enclosure. As a result, the hole can be accessed from the exterior. Other embodiments can be derived from the figures.

This embodiment has the advantage that the number of components is reduced and assembly effort is also reduced, because no screws, spring elements, or soldering points are needed. Space is also saved, and a greater freedom in packaging can be used, because these parts that are not needed do not need to be taken into account for the installation. Installation space can also be saved, because clearances and creep distances are reduced in comparison with simple power rails. Additional freedom in packaging is obtained through the reduction of conductive surfaces. The embodiment can also advantageously better withstand vibrations. Furthermore, contact can be made to the power supply over the entire cross section of a supply element. Further, contact can be made to a consumer load module over the entire cross section of a conductor element.

According to one embodiment, the enclosure is sprayed onto the conductor structure. This enclosure is generated in an injection molding machine. This conductor structure then forms an insert component that is materially bonded to the enclosure.

This has the advantage that the holes are particularly robust. Consequently, the contacting device is less vulnerable to vibrations, and can be more easily installed.

According to one embodiment, the non-conductive material is a thermoplastic. Thermoplastics, also referred to as thermoplastic resins, are composed of uncured polymers. As a result, thermoplastics are somewhat elastic. Thermoplastics are also durable. Examples of thermoplastics are polystyrene (PS) and its copolymers (ABS: acrylonitrile butadiene styrene). Other examples of thermoplastics are polyamide (PA) and polyoxymethylene (POM).

This has the advantage that the holes can be finished precisely, and the contacting device will have a typical service life of 20 years with only slight wear.

According to one embodiment, the contacting device also comprises a locking receiver configured to receive locking elements.

The locking receiver comprises a projection, an opening, or a projection with an opening, configured to receive a locking element. A locking element has a latching lug, a push-fit pin, or a positioning pin, for example. The locking receiver forms a counterpart to the locking element. When the locking receiver receives the locking element, the locking element can be fixed in place in the locking receiver. The locking element can then only be removed from the locking receiver when a resistance is overcome, for example.

The locking element is placed in a power supply, for example. The power supply supplies power and provides the contacting device with electricity. The power supply can be a capacitor, battery, rechargeable battery, or rectifier, for example. The locking element can also be attached to another component, wherein the locking element is received in the locking receiver when the contacting device is plugged into the power supply.

This has the advantage that the locking device reinforces the fixing of the contacting device in place without the need for additional components. In particular, the contacting device can be secured against force counter to the direction in which it is inserted, i.e. counter to the direction in which the contacting device is plugged into the power element. This also improves properties of the contacting device with regard to vibrations.

According to one embodiment, the third hole is tapered. The hole is tapered in the insertion direction, i.e. in the direction in which a conductor element is inserted.

If, for example, the opening of the hole is rectangular, the size of which is slightly greater than the cross section of the conductor element, then a rear wall of the hole can have a rectangular cross section, the size of which is smaller than the cross section of the conductor element in at least one dimension. If, for example, the conductor element has a cross section of 2 mm×5.5 mm, the hole can have a cross section of 1.8 mm×5.5 mm at its rear wall. As a result, the conductor element is clamped into the hole when it is inserted therein.

This has the advantage that a consumer load module is securely fixed in place and contacted in the contacting device, without the need for additional complex components that are vulnerable to wear. Furthermore, the attachment is surprisingly even more robust when in operation, because the conductor element expands when heated.

Additionally or alternatively, the first hole and/or second hole can also be tapered accordingly.

According to another aspect of the invention, the object specified in the introduction is achieved by a power supply system that comprises a contacting device according to any of the embodiments specified above, and a power supply containing a first supply element and a second supply element, wherein the first supply element is received in the first hole such that the first fastener is electrically connected to the power supply, and the second supply element is received in the second hole such that the second fastener is electrically connected to the power supply.

The power supply system contains a contacting device according to any of the embodiments described above, and a power supply.

The power supply supplies power and provides the contacting device with electrical energy. The power supply can be a capacitor, battery, rechargeable battery, or rectifier. This power supply contains a first supply element and a second supply element. The supply elements comprise pins, which can also be referred to as lugs or jacks, made of a conductive material. The first supply element can be connected to an electrical potential that differs from the electrical potential connected to the second supply element. The first supply element can also contain numerous pins or jacks connected to different potentials. The second supply element can likewise contain numerous pins, connected to the same or different potentials of those connected to the first supply element.

The first supply element of the power supply is received in the first hole in the contacting device, such that the first fastener is electrically connected to the power supply. The second supply element of the power supply is then received in the second hole in the contacting device, such that the second fastener is electrically connected to the power supply.

This has the advantage that the power supply system can be quickly and easily assembled. Moreover, the power supply system is compact and requires little installation space.

According to one embodiment, the power supply system comprises a consumer load module that contains a conductor element, wherein the conductor element is received in the third hole, such that the consumer load module is electrically connected to the power rail.

A consumer load module comprises a control unit in a motor vehicle in this case. By way of example, a consumer load module comprises numerous control units. The consumer load module can also comprise other electrical consumer loads, e.g. a lighting device, transmitter, heater, or electric motor.

In one example, the consumer load module contains numerous conductor elements, and the contacting device contains a corresponding number of holes. As a result, numerous electrical connections can be obtained in a single step, in which the conductor elements are inserted in the holes such that the consumer load modules are electrically connected to the power rail. As a result, the individual conductor elements do not have to be accessible to tools, as is the case, for example, with a screw-connection.

This has the advantage that assembly effort is further reduced, behavior with regard to vibrations is further improved, and new packaging variations are allowed for.

According to another aspect of the invention, the object specified in the introduction is achieved by a method for producing a contacting device comprising a U-shaped conductor structure made of an electrically conductive material, and containing a first fastener, a second fastener, and a power rail, placing a first cover over the first fastener, placing a second cover over the second fastener, placing a third cover over the power rail, and encompassing the U-shaped conductor structure with a non-conductive material, such that first, second, and third holes are formed in the regions of the first, second, and third covers.

The method comprises a first step for providing a U-shaped conductor structure made of an electrically conductive material, and containing a first fastener, a second fastener, and a power rail.

A leaf made of an electrically conductive material can be bent into a U-shape, for example, in this first step. Alternatively, three leaves made of an electrically conductive material can be welded into a U-shape in this step.

The method also comprises another step in which a first cover is placed on the first fastener. This first cover then partially covers a surface of the first fastener, e.g. on one side of the fastener, over the entire width and over a specific length of the first fastener. The first cover can be glued onto the first fastener, painted onto the first fastener, clamped to the first fastener, magnetically retained on the first fastener, or pressed into a retaining element on the first fastener, for example.

In a second step, a second cover is placed on the second fastener. The second cover partially covers a surface of the second fastener, e.g. on one side of the second fastener, over the entire width and over a specific length of the second fastener. The second cover can be glued onto the second fastener, painted onto the second fastener, clamped to the second fastener, magnetically retained on the second fastener, or pressed into a retaining element on the second fastener, for example.

In another step, a third cover is placed on the power rail. This third cover partially covers a surface of the power rail, e.g. on one side of the power rail, over the entire width and a specific length of the power rail. The third cover can be glued to the power rail, painted onto the power rail, clamped to the power rail, magnetically retained on the power rail, or pressed into a retaining element on the power rail, for example.

In a further step, the U-shaped conductor structure is encompassed in a non-conductive material, such that first, second, and third holes are formed in the regions of the first, second, and third covers. These holes are formed when the covers are removed. The covers can dissolve, evaporate, or liquefy during the encompassing, for example. The covers can also be dissolved after the encompassing, e.g. by dissolving them in water, oil, or a solvent. The covers can also be pulled off, scratched off, or extruded, for example. The covers are typically removed using demolding pins.

The method has the advantage that the effort required to execute the method can be reduced, e.g. in comparison with screwing procedures. There is also no need for additional components, e.g. sockets. As a result, a contacting device can be quickly, easily, and inexpensively produced with the method. The contacting device can also be made particularly compact, because the conductors are well insulated against one another and to the exterior. This also allows for new packaging variations.

According to one embodiment, the encompassing comprises injection molding. An injection molding procedure in an injection molding machine is used for this. The U-shaped conductor structure is placed in an injection molding tool for this, e.g. the U-shaped conductor structure can be clamped in the injection molding tool. The U-shaped conductor structure forms a so-called insert. The non-conductive material is subsequently injected into the tool. After completion of the procedure, the non-conductive material is materially bonded to the U-shaped conductor structure. As a result, the contacting device is less vulnerable to vibrations.

This has the advantage that the method for producing a contacting device is quick and economical. Furthermore, a particularly compact and robust contacting device can be produced, that can withstand vibrations well.

According to one embodiment, the injection molding comprises a thermoplastic injection molding. For this, a thermoplastic granulate is heated in an injection molding machine, such that it becomes molten. The melt is subsequently injected into an injection molding tool, where it cools off and hardens. The thermoplastic is durable. Thermoplastics are elastic, strong, and stable, while still being inexpensive. In particular, thermoplastic injection molding does not take long.

This has the advantage that a contacting device can be produced quickly and inexpensively, which can be easily installed, and fixed securely in place.

According to one embodiment, encompassing the conductor structure comprises forming a locking receiver. The injection molding tool has a cut-out for this, such that a locking receiver is formed during the injection molding, as described above.

This has the advantage that a locking receiver is materially bonded to the contacting device. As a result, a robust locking can be ensured. This also requires no additional components, resulting in a quick and inexpensive method for producing a contacting device.

According to one embodiment, placing the third cover comprises forming a taper. A tapered third cover can be used, for example, or an additional element can be placed such that a taper is obtained in the encompassing step. By way of example, a tapered third cover can be obtained by removing part of the third cover.

Alternatively, a taper can be obtained by removing part of the enclosure in the region of the third hole.

Alternatively or additionally, a taper can be formed when placing the first or second cover.

This has the advantage that a stable attachment and contact to a consumer load module can be obtained without the need for other components or complicated steps.

According to one embodiment, the method comprises another step for inserting a first supply element from a power supply into the first hole, such that the first fastener is electrically connected to the power supply, and a step for inserting a second supply element from a power supply into the second hole, such that the second fastener is electrically connected to the power supply.

This has the advantage that the contacting device can be very quickly and easily connected to the power supply, such that it is in electrical contact therewith.

According to one embodiment, the method also comprises a step for inserting a conductor in a consumer load module into the third hole, such that the consumer load module is electrically connected to the power rail.

If the consumer load module contains numerous conductor elements, all of the conductor elements in the consumer load module can be inserted in another step into corresponding holes in the contacting device.

This has the advantage that the consumer load module can be quickly and easily attached to the contacting device, such that it is in electrical contact therewith.

Regarding advantages of the system and the method, reference is also made to the advantages of the contacting device described above.

The invention shall now be described in greater detail in reference to the attached figures, in which

The same reference symbols in the figures indicate the same or similar features.

Figure 1:
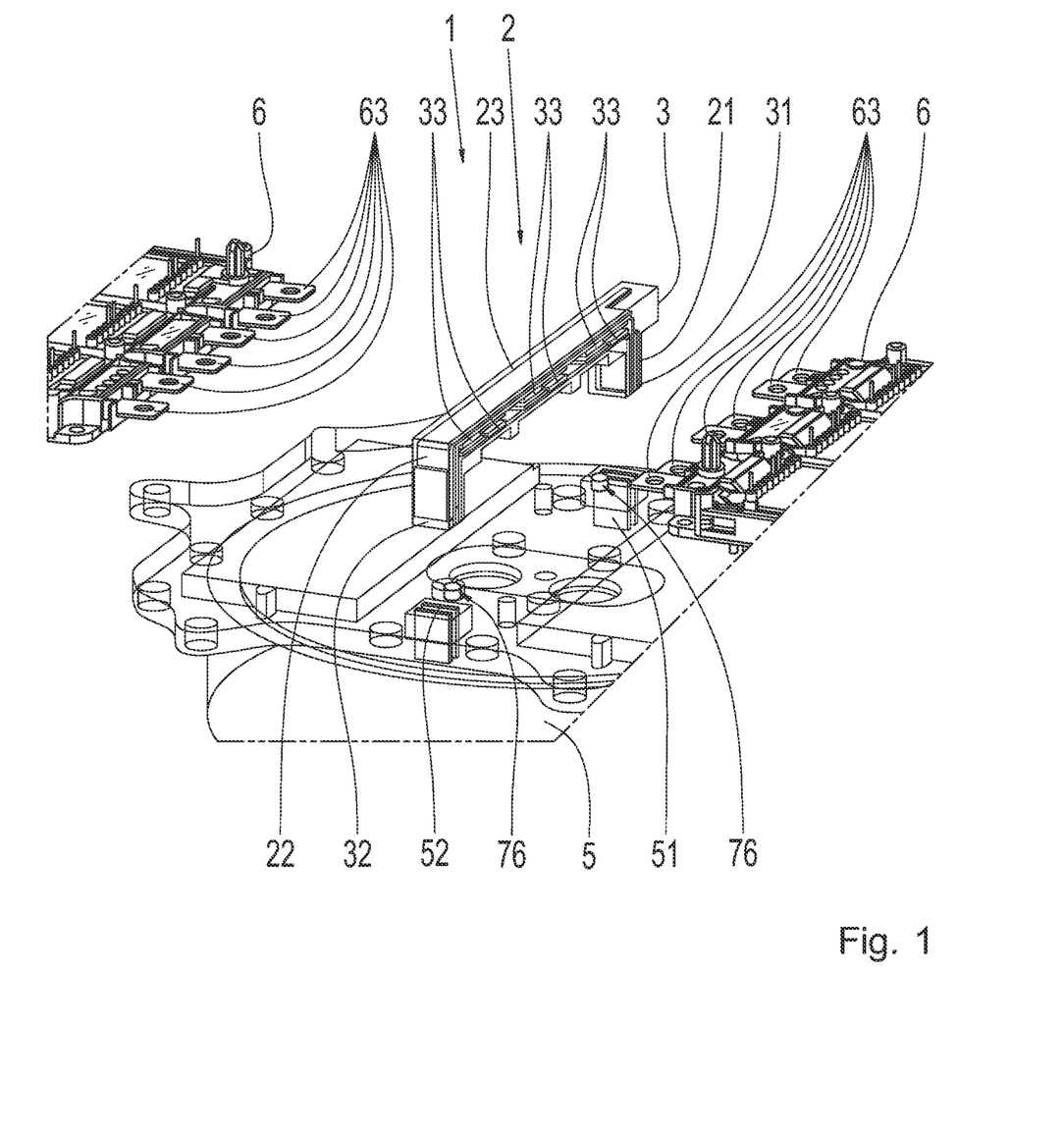
FIG. 1 shows a schematic illustration of a power supply system that contains a contacting device according to one embodiment.

FIG. 1 shows a schematic illustration of a power supply system that contains a contacting device 1 according to one embodiment.

The contacting device 1 comprises a U-shaped conductor structure 2, which contains a first fastener 21, a second fastener 22, and a power rail 23. The conductor structure 2 is made of a conductive material, e.g. copper, brass, or aluminum.

As is shown in FIG. 1, the U-shaped conductor structure 2 is composed of two legs that do not touch one another. In other embodiments, not shown, the conductor structure 2 can be made of a single U-shaped bail, or numerous U-shaped bails.

A bail is made of an integral, i.e. single-piece metal rail, bent at two points in the same direction. The conductor structure 2 is made of two such bails in the embodiment shown in FIG. 1, the upper one of which is slightly larger than the other.

In another embodiment, not shown herein, the conductor structure 2 is made of just one bail, and is therefore entirely made of a single piece. The conductor structure 2 composed of the first fastener 21, second fastener 22, and the power rail 23 is then integral.

The contacting device 1 also comprises an enclosure 3 made of a non-conductive material. The enclosure 3 nearly entirely encompasses the conductor structure 2, with the exception of a first hole 31, a second hole 32, and a third hole 33. The enclosure thus insulates the bails in the conductor structure 2 against one another and to the exterior.

The power supply system also comprises a power supply 5 that contains an electrically conductive first supply element 51 and an electrically conductive second supply element 52.

The power supply system also comprises consumer load modules 6 that have conductor elements 63. A consumer load module 6 combines numerous control units in this case. As a result, numerous control units can be mounted on the contacting device in one step, such that the assembly effort is reduced. In another embodiment, not shown, a consumer load module 6 can contain a single control unit, or a conductive connection to another module.

The first hole 31 in the enclosure 3 is on the first fastener 21. The first hole 31 is configured to receive the first supply element 51 between the fastener 21 and the enclosure, thus electrically connecting the first supply element 51 to the first fastener 21. As can be seen in FIG. 1, the first supply element 51 has two parts, composed of two conductive projections. In other embodiments, not shown herein, the first supply element 51 can also be made of a single part or numerous parts. The same or different potentials can be applied to the individual projections, which can also be referred to as lugs, pins, or jacks. The first supply element 51 thus comprises two pins 51, to one of which the positive potential of the power supply 5 is applied, and to the other of which a ground for the power supply 5 is applied. The power supply 5 contains a DC voltage source for this. When the first supply element 51 is received in the first hole 31, a first lug of the first supply element 51 is received in a first region of the first hole 31, and this first lug is electrically connected to a first bail of the first fastener 21, while another lug on the first supply element 51 is received in another region of the first hole 21, and this other lug is electrically connected to another bail in the first fastener 21. As a result, the first supply element 51 is received with all of the lugs in the first hole 31 in one step. As a result, the first fastener 21 is plugged or pushed onto the first supply element 51, or the first supply element 51 is inserted or pressed into the first hole 31.

In another embodiment, not shown, the first supply element 51 has just one lug. In another embodiment, not shown, the first supply element 51 has numerous lugs. The first hole 31 can correspond to the first supply element 51.

The first hole 31 lies in a first plane, in which the first fastener 21 also lies. The second hole 32 lies in a second plane, in which the second fastener 22 also lies. These first and second planes are parallel to one another. The first fastener 21 and the second fastener 22 are plugged onto the first supply element 31 and the second supply element 32 in one step. One can also say that the contacting device 1 is plugged onto the power supply 5.

When the first supply element 51 is thus received in the first hole 31, and the second supply element 52 is received in the second hole 32, the first supply element 51 also lies in the first plane, and the second supply element 52 also lies in the second plane. As a result, the contacting device 1 is prevented from sliding or rotating, and therefore fixed in place on the power supply 5. The contacting device 1 can thus be plugged onto the first supply element 51 and the second supply element 52 at the same time, and fixed in place there. The first hole 31 and the second hole 32 are sized such that they can receive the first supply element 51 and the second supply element 52, and clamp them in place. Because the supply elements 51, 52 expand when they are heated, a force-fit is obtained, which makes the connection between the contacting device 1 and the supply elements 51, 52 more stable. A robust attachment that is less vulnerable to vibrations is therefore obtained, in particular when the power supply 5 is in operation.

The third holes 33 in the enclosure 3 are at the power rail. The sizes of these third holes 33 are different than the sizes of the first hole 31 and the second hole 32. In an alternative embodiment, not shown, the first, second, and third holes 31, 32, 33 are all the same size. The third holes 33 are configured to receive conductor elements 63 between the power rail 23 and the enclosure 3, and thus electrically connect the conductor elements 63 to the power rail 23. Six of these holes 33 can be seen directly in FIG. 1, and another six of these holes 33 are indicated on the opposite side. In another embodiment, not shown herein, the enclosure 3 only has one third hole 33, or it can have an arbitrary number of third holes 33. Each of these holes 33 is on the power rail 23. The holes are sized such that they can receive the conductor elements 63 and clamp them in place. By heating the conductor element 63 such that it expands, a force-fit is obtained, which makes the connection between the contacting device 1 and the conductor elements 63 more stable. A robust, low-vibration attachment is therefore obtained, in particular when the power supply 5 is in operation.

The power rail 23 in FIG. 1 contains numerous bails, as described above. A third hole 33 is attached to just one of the bails, as shown in FIG. 1, and is configured to receive the conductor element 63 between this bail and the enclosure, and thus electrically connect the conductor element to just this bail. Another third hole 33 is connected to the same bail. A third hole 33 is connected to another bail. As a result, a first bail of the conductor structure 2 is electrically connected to the positive potential of the power supply, and another bail in the conductor structure 2 is electrically connected to the ground in the power supply.

In other embodiments, not shown herein, the third hole 33 can also be attached to numerous bails, and configured to receive the conductor element 63 between these bails and the enclosure, and thus electrically connect the conductor element 63 to these bails collectively.

The consumer load module 6 in FIG. 1 contains numerous conductor elements 63. These conductor elements 63 are received in corresponding holes 33. As a result, the consumer load module is prevented from sliding or rotating, and fixed in place on the power supply 5. As a result, the consumer load module 6 can be simply plugged into the contacting device 1, and secured in place.

The third holes 33 in the contacting device 1 receive the conductor elements 63, such that the consumer load module 6 is electrically connected to the power rail. The positive potential of the consumer load module 6 is electrically connected to a first bail in the power rail 23, and the ground for the consumer load module 6 is electrically connected to another bail in the power rail 23, as can be seen in FIG. 1.

Locking elements 76 are also shown in FIG. 1 on the power supply 5, which are configured to be received in locking receivers, not shown in the figure for purposes of clarity.

Figure 2:
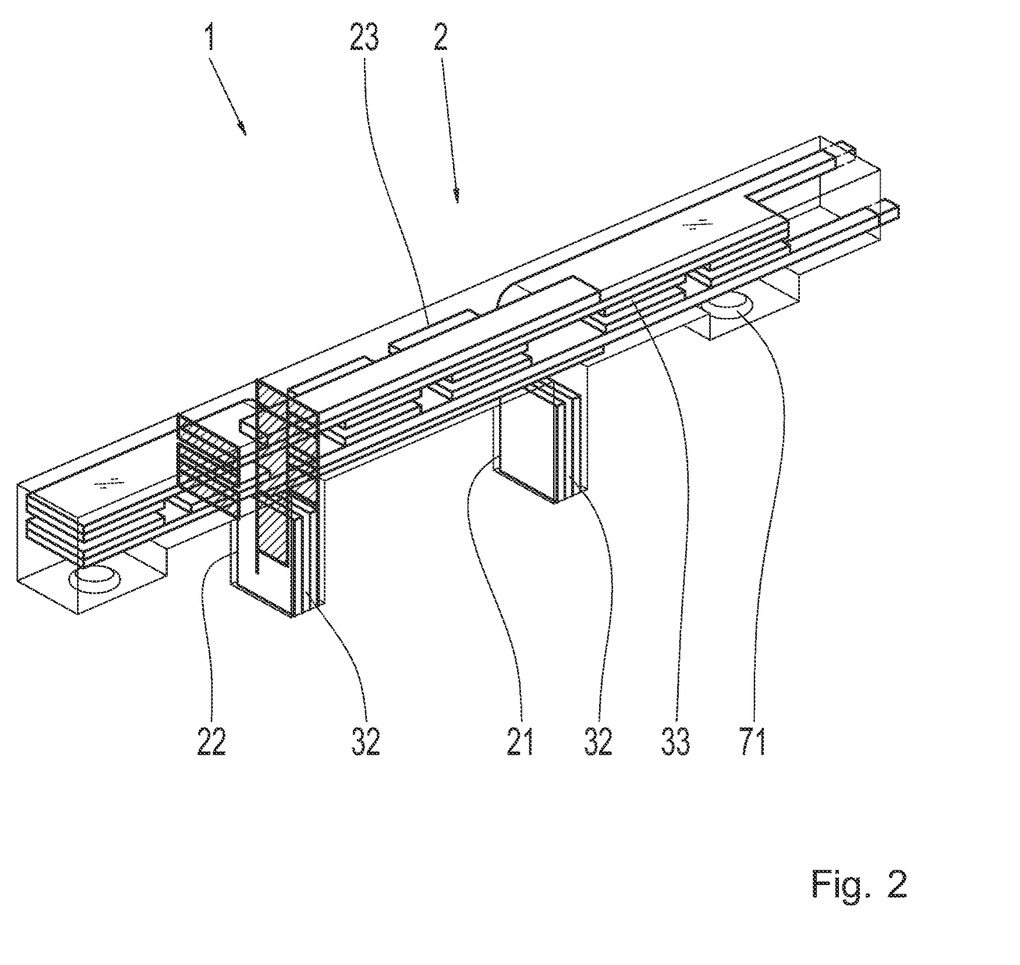
FIG. 2 shows a schematic illustration of a contacting device according to one embodiment.

FIG. 2 shows a schematic illustration of a contacting device 1 according to one embodiment. The contacting device 1 is a further development of the contacting device 1 shown in FIG. 1, and likewise comprises a U-shaped conductor structure 2, made of an electrically conductive material and containing a first fastener 21, a second fastener 22, and a power rail 23. The power rail 23 extends beyond the first fastener 21 and the second fastener 23, such that the conductor structure 2 contains additional projections over the U-shape. As in FIG. 1, the contacting device 1 can be simultaneously plugged onto a first supply element 51 and a second supply element 52.

The conductor structure is encompassed by an enclosure 3, like the embodiment shown in FIG. 1, which substantially covers the conductor structure. A part of the enclosure 3 is marked with a cross-hatching in the region of the power rail 23, which shall be explained in greater detail in reference to FIG. 3.

Figure 3:
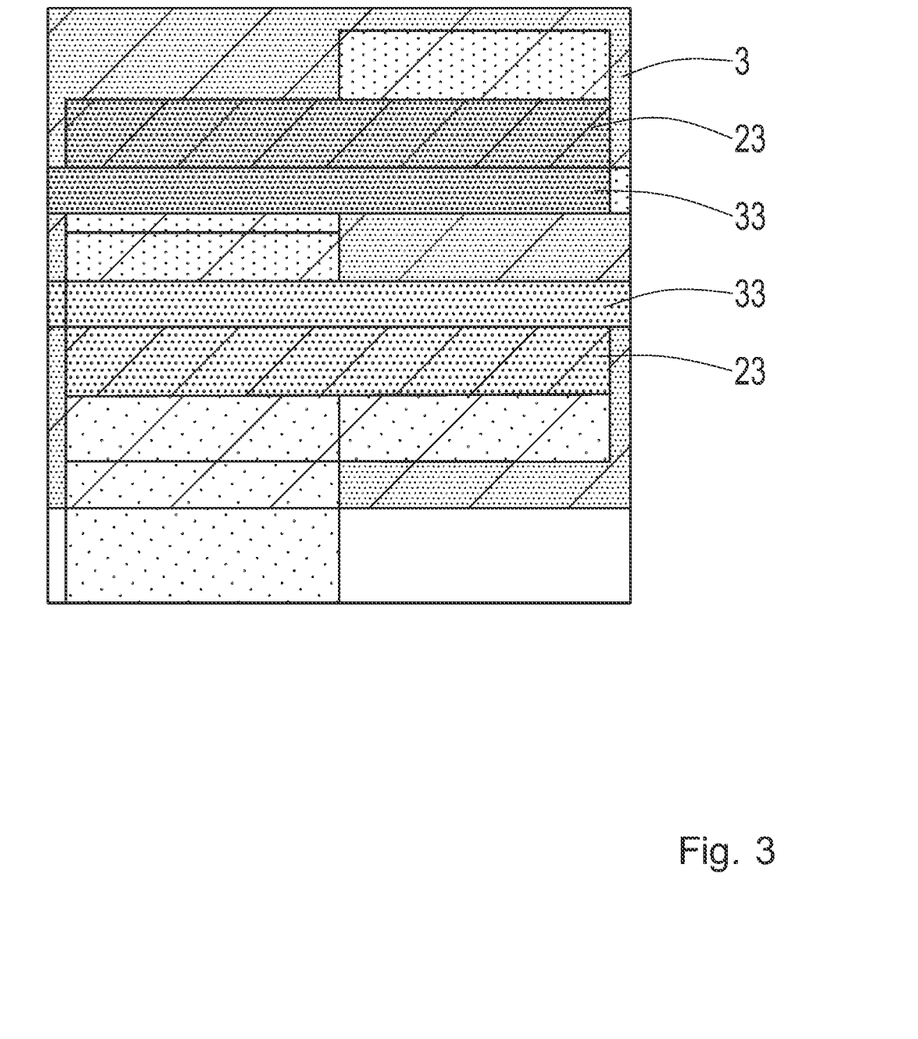
FIG. 3 shows a cross sectional view of part of the contacting device from FIG. 2.

FIG. 3 shows a cross sectional view of part of the contacting device shown in FIG. 2. The power rail 23 can be seen therein, which comprises two bails, as is the case in FIG. 1 and in FIG. 2. The power rail 23 is encompassed by the enclosure 3, wherein there is a hole 33 on one side of the contacting device 1 in the region of the cross section, which reaches to a first bail in the power rail 23. There is another hole 33 on the opposite side of the contacting device 1, which reaches to another bail in the power rail 23.

The hole 33 has a rectangular cross section, which is slightly larger than the cross section of a conductor element 63 that is received therein. The conductor element 63 has a cross section of 2 mm×5 mm, and the hole has a cross section of 2.2 mm×5.5 mm, for example. As can be seen in FIG. 3, the hole 33 is also tapered in the insertion direction. The shorter of two sides is tapered. By way of example, at its rear wall, the hole has a cross section of 1.8 mm×5.5 mm. As a result, the conductor element 63 is clamped into the hole 33 when it is inserted in the hole 33. When the conductor element 63 expands due to heating while in operation, the clamping is further reinforced. Furthermore, the placement of the conductor element 63 in the hole 33 remains easy.

FIG. 3 also shows locking receivers 71 that receive the locking elements 76 in the power source 5 and thus lock the contacting device 1 to the power supply 5 such that it cannot be pulled out.

Figure 4:
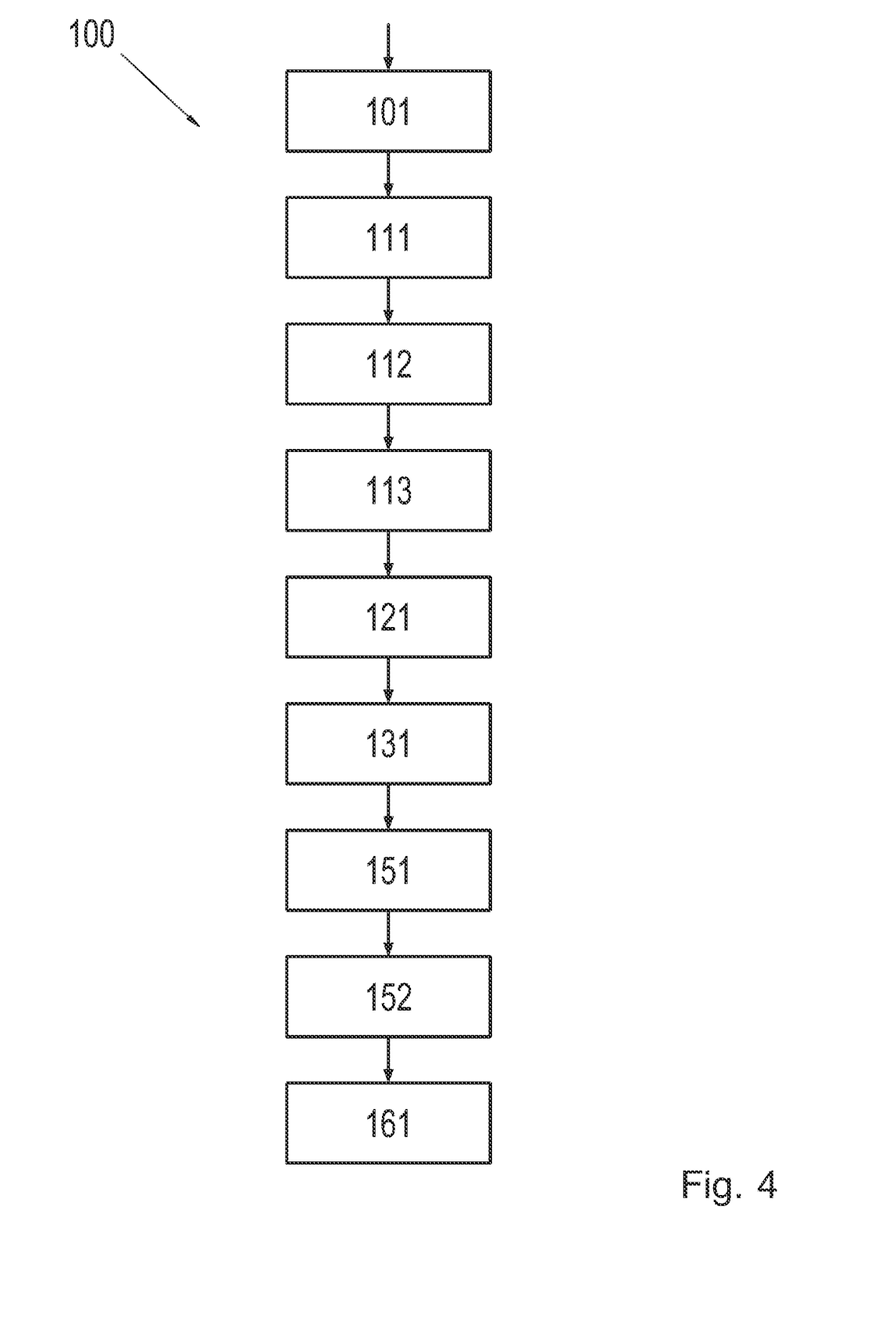
FIG. 4 shows a block diagram of a flow chart according to one embodiment.

FIG. 4 shows a block diagram of a method 100 according to one embodiment. The method starts at a first step 101 for providing a U-shaped conductor structure composed of an electrically conductive material, which has a first fastener, a second fastener, and a power rail.

In the next step 111, the method comprises placing a first cover on the first fastener. The first cover is placed on a surface of the first fastener such that the surface of the first fastener is partially covered.

In a subsequent step 112, the method comprises placing a second cover on the second fastener. The second cover is placed on a surface of the second fastener such that the surface of the second fastener is partially covered.

In the next step 113, the method comprises placing a third cover on the power rail. The third cover is placed on a surface of the power rail such that the surface of the power rail is partially covered. A taper is formed in the third cover in this step 113. This taper is formed as described above.

In the next step 121, the method comprises encompassing the U-shaped conductor structure with a non-conductive material, such that first, second, and third holes are formed in regions of the first, second, and third covers. The encompassing comprises injection molding, in particular thermoplastic injection molding. The first, second, and third covers are removed with demolding pins, such that the first, second, and third holes are formed.

In a subsequent step 151, the method comprises inserting a first supply element from a power supply into the first hole, such that the first fastener is electrically connected to the power supply. The insertion of the first supply element into the first hole comprises simultaneously inserting two lugs on the first supply element into two regions in the first hole, such that the one lug is electrically connected to a bail in the first fastener, and the other lug is electrically connected to another bail in the first fastener.

In another step 152, the method comprises inserting a second supply element in the power supply into the second hole, such that the second fastener is electrically connected to the power supply. The insertion of the second supply element into the second hole comprises simultaneously inserting two lugs on the second supply element into two regions in the second hole, such that the one lug is electrically connected to a bail in the second fastener, and the other lug is electrically connected to another bail in the second fastener. This step can take place at the same time as the preceding step 151.

In a subsequent step 161, the method comprises inserting a conductor element in a consumer load module into the third hole, such that the consumer load module is electrically connected to the power rail. The insertion of the conductor element into the third hole comprises simultaneously inserting two lugs on the conductor element into two regions in the third hole, such that the one lug is electrically connected to a bail in the power rail, and the other lug is electrically connected to another bail in the power rail.

REFERENCE SYMBOLS 1 contacting device
2 conductor structure 21 first fastener
22 second fastener
23 power rail
3 enclosure
31 first hole
32 second hole
33 third hole
5 power supply
51 first supply element
52 second supply element
6 consumer load module
63 conductor element
71 locking receiver
76 locking element
100 method for producing a contacting device
101 providing step
111 placement step
112 placement step
113 placement step
121 encompassing step
131 forming step
151 insertion step
152 insertion step
161 insertion step

The invention claimed is:

1. A contacting device, comprising:
a U-shaped conductor structure comprising:
   an electrically conductive material;
   a first fastener;
   a second fastener;
   a power rail; and
   an enclosure encompassing the conductor structure, the enclosure made of a non-conductive material,
wherein the enclosure has a first hole at a location of the first fastener, the first hole configured to receive a first supply element of a power supply between the first fastener and the enclosure and electrically connect the first supply element to the first fastener, such that the first fastener is electrically connected to the power supply,
wherein the enclosure has a second hole at a location of the second fastener, the second hole configured to receive a second supply element of the power supply between the second fastener and the enclosure and electrically connect the second supply element to the second fastener, such that the second supply element is electrically connected to the power supply, and
wherein the enclosure has a third hole at a location of the power rail, the third hole configured to receive a conductor element between the power rail and the enclosure and electrically connect the conductor element to the power rail.

2. The contacting device according to claim 1, wherein the non-conductive material of the enclosure is sprayed onto the conductor structure.

3. The contacting device according to claim 1, wherein the non-conductive material is a thermoplastic.

4. The contacting device according to claim 1, also comprising:
a locking receiver configured to receive a locking element.

5. The contacting device according to claim 1, wherein the third hole is tapered.

6. A power supply system, comprising:
the contacting device according to claim 1; and
the power supply comprising the first supply element and the second supply element.

7. The power supply system according to claim 6, also comprising:
a consumer load module comprising a conductor element, wherein the third hole receives the conductor element such that the consumer load module is electrically connected to the power rail.

8. A method for producing a contacting device, comprising:
providing a U-shaped conductor structure comprising an electrically conductive material, a first fastener, a second fastener, and a power rail;
placing a first cover on the first fastener;
placing a second cover on the second fastener;
placing a third cover on the power rail;
inserting a first supply element of a power supply into the first hole, such that the first fastener is electrically connected to the power supply;
inserting a second supply element of the power supply into the second hole, such that the second fastener is electrically connected to the power supply; and
encompassing the U-shaped conductor structure with a non-conductive material, such that a first hole, a second hole, and a third hole are formed in regions of the first cover, the second cover, and the third cover, respectively.

9. The method according to claim 8, wherein encompassing the U-shaped conductor structure comprises an injection molding process.

10. The method according to claim 9, wherein the injection molding process comprises a thermoplastic injection molding process.

11. The method according to claim 8, wherein encompassing the U-shaped conductor structure comprises forming a locking receiver.

12. The method according to claim 8, wherein placing the third cover comprises forming a taper.

13. The method according to claim 8, also comprising:
inserting a conductor element of a consumer load module into the third hole, such that the load consumer module is electrically connected to the power rail.

14. The power supply system according to claim 6, wherein the non-conductive material of the enclosure is sprayed onto the conductor structure.

15. The power supply system according to claim 7, wherein the non-conductive material of the enclosure is sprayed onto the conductor structure.

16. The power supply system according to claim 6, wherein the contacting device also comprises:
a locking receiver configured to receive a locking element.

17. The power supply system according to claim 6, wherein the third hole is tapered.

18. The power supply system according to claim 7, wherein the third hole is tapered.

19. A contacting device, comprising:
a U-shaped conductor structure comprising:
   an electrically conductive material;
   a first fastener;
   a second fastener;
   a power rail; and
   an enclosure encompassing the conductor structure, the enclosure made of a non-conductive material,
wherein the enclosure has a first hole at a location of the first fastener, the first hole configured to receive a first supply element between the first fastener and the enclosure and electrically connect the first supply element to the first fastener, wherein the enclosure has a second hole at a location of the second fastener, the second hole configured to receive a second supply element between the second fastener and the enclosure and electrically connect the second supply element to the second fastener, and wherein the enclosure has a third hole at a location of the power rail, the third hole configured to receive a conductor element of a consumer load module between the power rail and the enclosure and electrically connect the conductor element to the power rail, such that the consumer load module is electrically connected to the power rail.

\* \* \* \* \*